United States Patent

Goldmark

[15] 3,679,817

[45] July 25, 1972

[54] RECORD MEDIUM FOR PICTURE INFORMATION

[72] Inventor: Peter C. Goldmark, Stamford, Conn.

[73] Assignee: Columbia Broadcasting System, Inc

[22] Filed: April 20, 1971

[21] Appl. No.: 135,687

[52] U.S. Cl. ................178/5.4 CD, 178/6.7 A, 179/100.3 B, 352/72, 352/78

[51] Int. Cl. ...................G11b 7/08, G11b 23/04, H04n 5/84

[58] Field of Search ................................178/5.4 CD, 6.7 A; 179/100.2 Z, 100.3 B; 352/72, 78

[56] References Cited

UNITED STATES PATENTS

| | | | |
|---|---|---|---|
| 3,523,657 | 8/1970 | Hearon | 352/78 R |
| 3,614,302 | 10/1971 | Goldmark | 178/5.4 CD |

*Primary Examiner*—Howard W. Britton
*Attorney*—Spencer E. Olson

[57] ABSTRACT

A record medium for use in the reproduction of picture information in the form of an elongated strip of recording material, such as photographic film, on which four sequences of mutually adjacent frames are disposed longitudinally in parallel relationship, each sequence representing a segment of picture information. Designating the lateral positions of the sequences across the film in ascending order from one to four, the frames of the first and third sequences are oriented for reading of their picture information with film motion in one longitudinal direction, and the frames of the second and fourth sequences are oriented for reproduction as the film is advanced in the opposite direction. In a preferred embodiment, the film contains two color programs, with one of the first and third sequences of frames containing monochrome representations of the luminance information of color pictures, and the other containing monochrome representations of the chrominance information of corresponding color pictures. Similarly, the second and fourth sequences of frames contain the luminance and chrominance information of a second color program. The film is packaged in a flip-over type cassette to facilitate playback of the film in either of the two longitudinal directions.

13 Claims, 5 Drawing Figures

INVENTOR.
PETER C. GOLDMARK
BY
ATTORNEY

INVENTOR.
PETER C. GOLDMARK
BY

ATTORNEY

INVENTOR.
PETER C. GOLDMARK
BY Spencer E. Olson
ATTORNEY

INVENTOR.
PETER C. GOLDMARK

BY [signature]

ATTORNEY

INVENTOR.
PETER C. GOLDMARK
BY
[signature]
ATTORNEY

RECORD MEDIUM FOR PICTURE INFORMATION

BACKGROUND OF THE INVENTION

This invention relates generally to the recording and reproduction of picture information, and more particularly to a record medium for the efficient storage and convenient reproduction of picture information in either monochrome or color. More specifically, the invention is concerned with a record medium having at least two video programs recorded thereon in opposite directions.

A system for electronically recording and reproducing color video information is described in an article entitle "Color EVR" appearing in the September 1970 issue of the IEEE Spectrum. In the described system, color television signals are recorded in two successions of side-by-side frames on 8.75 mm wide, high resolution photographic film, with one frame of each companion pair containing luminance information in visible form as a black and white picture of a scene, and the other frame of the pair containing coded color information which appears on the film as a series of very fine vertical bars. During reproduction, the two companion frames are scanned simultaneously and a color video output signal suitable for application to a television receiver is generated. For black and white programs, the frames described as containing the color information instead contain a second sequence of luminance information frames representing a second program. A given amount of film can, therefore, contain twice as much black and white programming as it can color programming.

Although the frames described in the referenced article are quite small, having dimensions of 3.1 × 2.5mm, they are capable of storing large amounts of information, be it motion or still picture information. However, to achieve quality pictures with such small frames requires high-precision recording equipment, such as an electron beam recorder which exposes the film in vacuum with a finely focused electron beam. The master film thus produced is duplicated with a suitable contact printer to produce release prints in relatively large numbers for commercial distribution.

In the described system, the processed film is packaged in a cartridge about the size of a standard movie film reel, and when recorded at 60 frames per second can hold a single color program of 25 minutes playing time or two black and white programs with a total playing time of 50 minutes. The cartridge is adapted for insertion into playback apparatus which automatically threads the film and which is controllable to perform various start, stop, rewind, and other manual and automatic operations. The player includes a flying spot cathode ray tube, the spot of which is projected through a suitable optical system to simultaneously scan a pair of companion frames in a television raster pattern. The light is modulated by the film and converted by a pair of photomultiplier tubes into separate luminance and chrominance-representing signals which are processed by the player electronics to produce NTSC signals suitable for application to the antenna terminals of a conventional television receiver.

The practical availability of pre-recorded video programs to the general public depends to a large extent on the cost of the player apparatus, and to a greater extent on the cost of the processed film. The cost of producing the record medium for the above-described system with the precision required for quality reproduction is necessarily quite high, and the cost of the film itself represents a significant portion of the cost. Thus, it is desirable, and it is an object of the present invention, to reduce the film cost, and the cost of processing, to reduce the cost of release prints to the ultimate consumer. Another factor of importance to the user is the degree of ease and convenience with which the record medium can be handled and used. Although the approximately 7-inch diameter cartridge of the above-described system contains 25 minutes of color programming it is desirable to have more playing time per film. And, although the automatic threading feature of the cartridge makes it convenient to use, it is, however, necessary to rewind the film at the termination of the program in order to remove it from the player; that is, the film cannot be stopped in the middle of the program and the cartridge removed without rewinding the film onto the cartridge. It is, therefore, another object of the present invention to provide pre-recorded video programming packaged in a form to contain more playing time per film and which permits removal of the film from the playback apparatus at any desired point in the program.

SUMMARY OF THE INVENTION

Briefly, these objects are attained by better utilizing the area of the record medium, which may be an elongated strip of photographic film, by recording thereon four sequences of mutually adjacent frames disposed longitudinally on the film in parallel relationship, each of which represents a segment of picture information. Designating the lateral positions of the sequences across the film in order from one to four, the recorded information in the first and third sequences is oriented for reproduction with film motion in one longitudinal direction, and the information contained in the frames of the second and fourth sequences is oriented for reproduction with film motion in the opposite direction. This arrangement of the recorded information permits packaging of the film in a cassette of the type having two reels, which when inserted in a suitable player allows the film to be advanced in two directions, depending upon the position of the cassette. For example, during one "pass", the player reproduces the picture information contained in the first and/or third sequences of frames, which, in the case of a color program, one of the sequences contains monochrome representations of the luminance information of color pictures and the other contains monochrome representations of the chrominance information. Each laterally corresponding pair of frames of these two sequences contain the luminance and color information for a given video scene and are scanned simultaneously. For black and white programs, the player can be set to read either the first or third sequence of frames during the particular pass.

When this pass is complete (or sometime therebefore, if desired), the cassette may be flipped over and the film advanced in the opposite direction to reproduce the picture information contained in the second and/or fourth sequences of frames.

When the programming is all in color, all of the film in the cassette is reproduced during two passes; on the other hand, when the cassette has all monochrome programming, four passes are needed. In either case, however, no threading or rewinding is required, a simple flip-over of the cassette being all the "film-handling" the user must perform. Also, the film can be stopped at any point in a program, and the cassette removed from the player.

In the preferred embodiment, the audio information associated with the programs is optically recorded on a pair of sound tracks disposed along the center line of the film between the second and third sequences of frames, and synchronizing marks, one per frame, required for playback are recorded along both edges of the film. The film is 11.6 mm wide so as to permit three four-sequence records to be made from standard, commercially available 35 mm film, thereby effecting an economy in film cost, and by better utilization of the film area, a threefold saving of film, as compared to the format described in the Spectrum article is realized. The cost is further reduced by approximately a factor of two through the use of Diazo film instead of the high-resolution silver-halide film employed in the earlier system. Through the combination of smaller frames and better utilization of film area, a cassette of convenient size contains 60 minutes of playing time for color programming, 30 minutes in each direction.

The improved record format provides the additional advantage of simplifying the design and improving the efficiency of the optical system in the playback apparatus. These advantages result in part from the fact that the luminance and color information sequences of a given color program are spaced further apart than in the format of the earlier system, thereby simplifying the optics required to separately read them.

BRIEF DESCRIPTION OF THE DRAWINGS

Other objects, features and advantages of the invention will be apparent from the following detailed description and the accompanying drawings, in which.

DESCRIPTION OF THE PREFERRED EMBODIMENT

Figure 1:
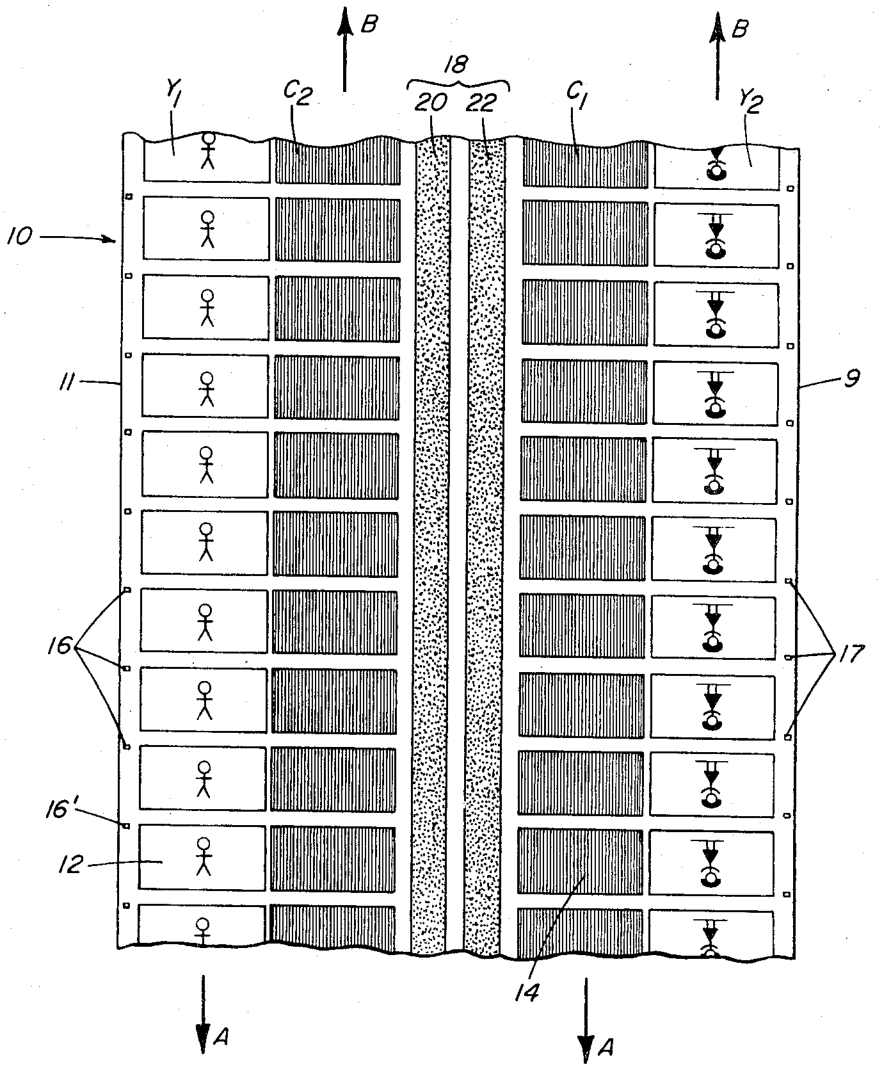
FIG. 1 is a plan view of a film record medium in accordance with the invention.

Referring now to FIG. 1, the record medium according to the invention is in the form of an elongated strip 10 of high-resolution film, which may be of the silver-halide or Diazo types, having a width one-third that of standard 35 mm film, or about 11.6 mm, so that three records can be made from commercially available 35 mm film. Recorded on the film are four substantially parallel sequences of mutually adjacent frames of picture information, each frame being about 87 mils wide and about 45 mils high. For convenience in describing and claiming the format, the lateral positions of the sequences across the film, from left to right in FIG. 1, are designated as the first, second, third and fourth sequences, and are labeled $Y_1$, $C_2$, $C_1$ and $Y_2$, respectively. The pair of sequences $y_1$ and $C_1$ respectively represent the luminance and the chrominance information of a first color program, and the pair of sequences $Y_2$ and $C_2$ respectively represent the luminance and chrominance information of a second color program. The frames of the first program are oriented for reproduction of their picture information as the film 10 is advanced in the direction indicated by the arrows A, and the frames of the second program are oriented for reproduction during film motion in the opposite direction, as indicated by the arrows B.

The information contained in the two color programs is preferably recorded in the manner described in co-pending application Ser. No. 519,106 of Goldmark and Hollywood filed Jan. 6, 1966, now abandoned in favor of continuation application Ser. No. 862,854 filed July 25, 1969, which in turn, has been abandoned in favor of continuation application Ser. No. 61,424 filed Aug. 5, 1970, and assigned to the assignee of the present application, and also in the above-referenced IEEE Spectrum article. Considering, for example, the laterally corresponding pair of frames 12 and 14 in sequences $Y_1$ and $C_1$, frame 12 contains a monochrome record of the luminance or brightness information in a video scene, such as a scene from a single frame of an original motion picture film. Companion frame 14 contains a coded monochrome record of the color information in the video scene, in the form of a carrier signal modulated in amplitude and phase in accordance with the saturation and hue of the color component in the original scene, together with a superimposed record of a reference or pilot carrier at a different frequency, typically one-half that of the color carrier, both frequencies being multiples of the line recording rate, whereby the color information appears as a series of closely-spaced vertical bars.

Adjacent the left edge 11 of the film 10 (as viewed in FIG. 1) and also adjacent the sequence of frames $Y_1$, in a margin which may be about ten mils wide, there are recorded a series of synchronizing marks 16, preferably in the form of transparent "windows". There is one synchronizing mark 16 associated with each companion pair of frames of the first color program, the synch mark 16' being associated, for example, with the related frame pair 14-16. The synchronizing marks are located at a fixed longitudinal position relative to their associated frame pair, and for the frame size mentioned earlier, having a spacing, or pitch, of 50 mils. The manner in which the synchronizing marks are used during reproduction of the record is described in detail in co-pending U.S. application Ser. No. 776,137 of Goldmark et al., filed Nov. 15, 1968 and assigned to the assignee of the present invention. For an understanding of the present invention, suffice it to say that light pulses produced by light passing through the synchronizing windows 16 initiate vertical flyback in the television display, and are also used to stabilize film speed. A second series of similarly spaced synchronizing marks 17, associated with companion frames $Y_2$ and $C_2$ of the second color program, are recorded in a margin along the right-hand edge 9 of the film.

The synchronizing marks also serve a useful function in the production of the film record itself. The completed record being one-third the width of commercially available 35 mm film, it is convenient in the production process to print three of the four-sequence records illustrated in FIG. 1 side-by-side on a strip of 35 mm file and thereafter slit the film into three separate film strips. Because of the small dimensions of the various separate areas of the film record, the requirement for close tolerances, and the need for high speed operation to achieve cost efficiencies, it is necessary to keep the film in line with the slitting cutters with extreme accuracy. The synchronizing windows having been recorded to very close tolerances, an edge of a selected series of windows is advantageously used as a reference in an optical steering system for developing a control signal for application to a suitable servo control loop to maintain the film in line.

With the film and frame widths mentioned earlier, there is available between the sequences $C_2$ and $C_1$ a center strip 18 approximately 50 mils wide on which to record two or more tracks of audio information associated with the recorded video programs. As illustrated in FIG. 1, two sound tracks 20 and 22, associated with the video contained in the first and second color programs, respectively, are recorded on the center strip 18. If desired, however, each of the tracks 20 and 22 may include two effective tracks side-by-side to provide stereophonic sound with each color program. In the case of monochrome programming, a total of four effective tracks would be required, one for each of the four possible monochrome programs on the film. The audio information on the tracks 20 and 22 is preferably optically coded and may be, for example, of the variable-area format disclosed in Goldmark et al. U.S. Pat. No. 3,335,219. Alternatively, the center strip 18 may be coated with a strip of magnetizable material on which the necessary sound tracks may be magnetically recorded.

It will be observed that the first and second color programs and their associated synchronizing marks and sound tracks are symmetrically positioned on the film 10, each with respect to one of the film edges 11 and 9. More specifically, the first color program ($Y_1$, $C_1$) is laid out on the film with reference to edge 11, and the second color program is referenced to the opposite edge 9. During reproduction, the film, which has no sprocket holes, is conveyed by a capstan drive, and if the color program is being reproduced, the edge 11 is used as a reference guide in the player as the film is advanced in the direction of the arrows A. Conversely, when the film is flipped over for reproduction of the second color program, the edge 9 serves as a reference guide as the film is advanced in the direction of the arrows B.

Figure 2:
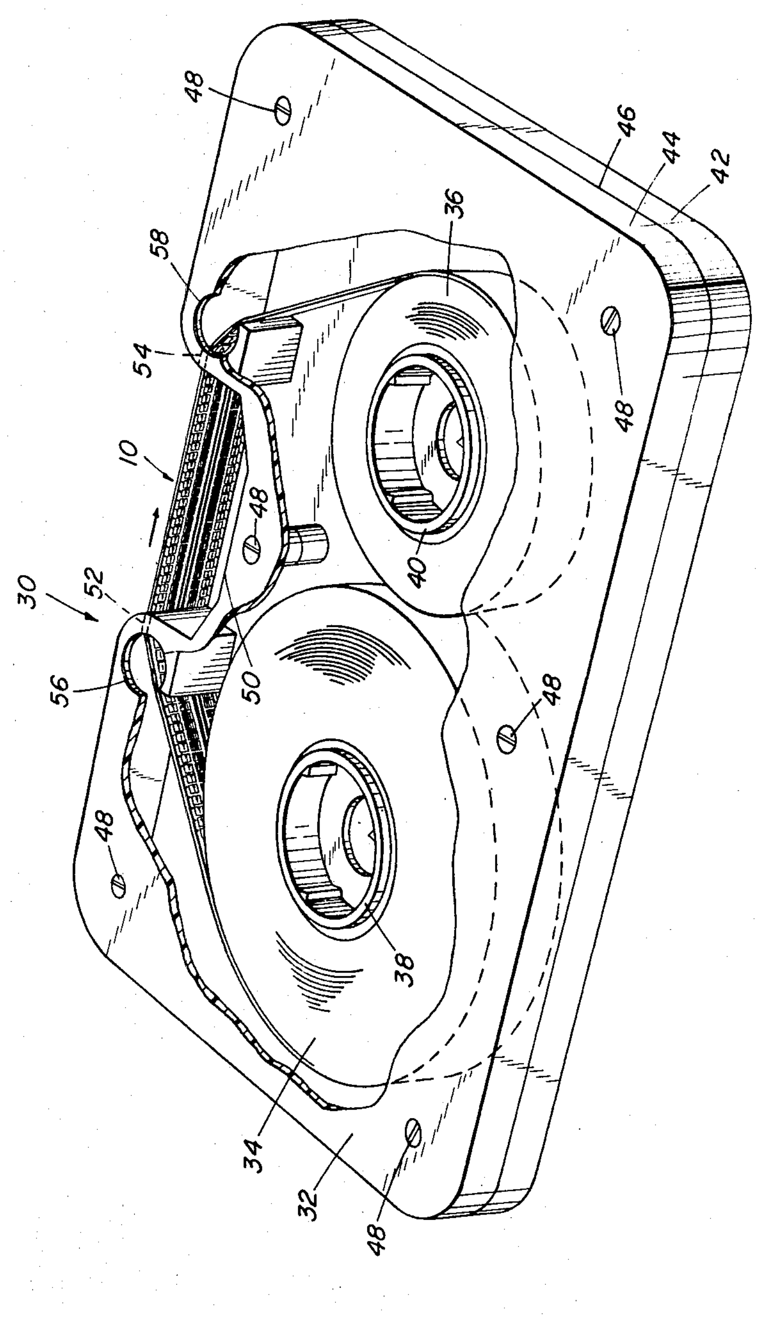
FIG. 2 is a perspective view, partially cut away, of a flip-over cassette containing the film record.

The record format illustrated in FIG. 1 not only efficiently utilizes the film area, but is readily adaptable for packaging in a cassette of the flip-over type to enable playback of the two color programs (actually, the second may be a continuation of the first) without rewinding of the film. In FIG. 2 there is illustrated a cassette 30 comprising a generally rectangular flat housing 32, which may be constructed of rigid plastic, for example, in which the film 10 is contained as two coils 34 and 36 wound on a pair of flangeless hubs 38 and 40, respectively. The axial dimension of the hubs is slightly greater than the spacing between the top and bottom walls of the housing so as to project slightly through respective spaced apart aligned openings in the top and bottom walls, thereby to position the housing and to permit rotation thereof. The housing is preferably formed of two mating parts to facilitate loading of the film, the base 42 and the cover 44 being joined along a line 46 and secured together by screws 48 located at the corners of the housing out of the way of the film. Centrally of one long edge, the housing is shaped to have a generally rectangular recess 50, having a length of approximately one-third the overall length of the housing, for receiving a portion of the player apparatus (to be described) when the cassette is placed thereon for replay.

The cassette is completely closed except for a pair of narrow slits 52 and 54 in the side wall of the housing at the open side of recess 50 through which the film passes in going from one coil to the other. Thus, the section of film extending between the two slits is exposed for playback. The housing has two circular openings 56 and 58 extending therethrough adjacent to slits 52 and 54, respectively (for receiving guide rollers in the player), these openings being partially walled interiorly of the housing to provide bearing surfaces 60 and 62 which support the film so that it extends substantially along the diameters of openings 56 and 58 as shown so as to permit entry into the openings of tapered guide rollers (in the player), which have a diameter slightly less than the diameter of the openings.

The spacing between the top and bottom walls of the housing is just slightly greater than the width of the film and thus serves to maintain the film in coil form. The two ends of the film are secured to the hubs 38 and 40 and is shown with a major portion thereof wound on coil 34. The hubs 38 and 40 are spaced apart at such a distance that for a film having a predetermined playing time, say, 30 minutes, the coils 34 and 36 are substantially tangent when each contains one-half of the film. It will be appreciated that as the film is transferred from one coil to the other, the radius of the first decreases at approximately the same rate as the radius of the second increases, the critical spacing occurring, however, when each coil contains half of the film. Thus, by using flangeless hubs, the overall length of the cassette is kept to a minimum. In the playback operation, the film is transferred from coil 34 to coil 36, in the direction of the arrow, over the guide rollers of the player (which are received in openings 56 and 58) to expose a section of the film.

Figure 3:
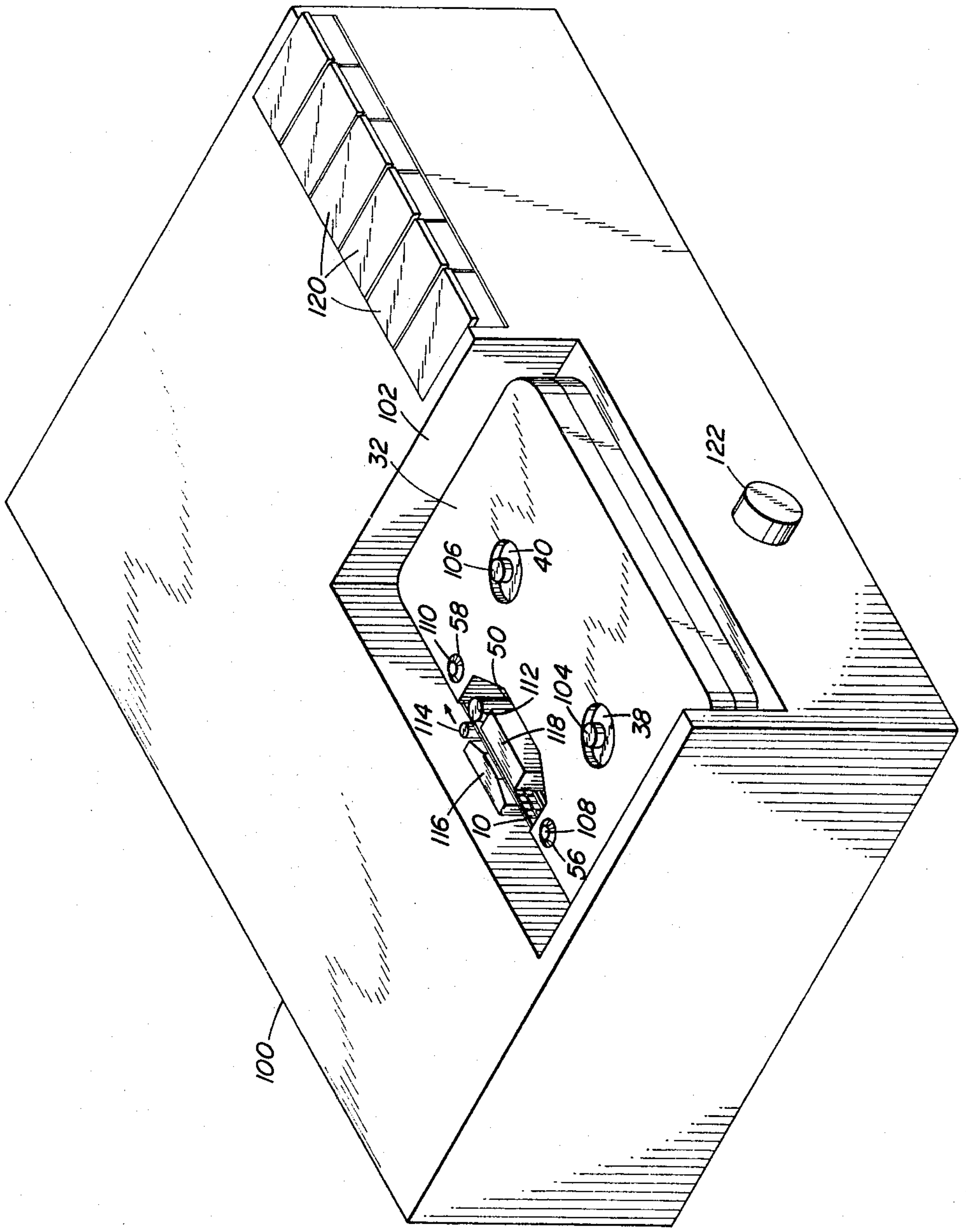
FIG. 3 is a perspective view of playback apparatus showing the flip-over cassette and film in engagement therewith.

The recorded picture information is reproduced in suitable playback apparatus, a preferred configuration being shown in FIG. 3, which comprises a housing 100 having a recess 102 in one corner of its upper surface for receiving the cassette 32. The cassette is placed over a pair of upstanding driven spindles 104 and 106 which respectively engage and drive the hubs 38 and 40, and over a pair of tapered guide rollers 108 and 110 which are received in openings 56 and 58 and engage the film. When positioned on the player, the housing is accurately positioned relative to the spindles 104 and 106 so that when the spindles engage the hubs, the latter are held out of contact with the housing; that is, the hubs, in effect, become part of the player to be rotated without interference from the housing. The film is driven in the direction of the arrow by coaction between a pressure roller 112 and a driven capstan 114 between a film gate 116 and a sensor assembly 118 which contains the necessary optics and sensors to convert the information recorded on the film to electrical signals. The first color program is reproduced as the film is transported from coil 34 to coil 36, and after the length of film containing the first program has been transferred to reel 36, the cassette is removed from the player, turned over, and reinserted over the drive spindles and guide rollers. The second program is reproduced as the film is transported back to coil 34 from coil 36, but the cassette having been turned over, the film motion is again in the direction of the arrow.

The playback apparatus has incorporated therein means for achieving a variety of film transport functions such as start, fast forward, rewind, and stop, which are selectively controlled by a plurality of push buttons 120 conveniently located at the top of the housing to the right of the cassette well. It is also possible to manually move the film backward or forward for still-frame viewing by manipulation of a control knob 122 on the front of the housing.

Figure 4:
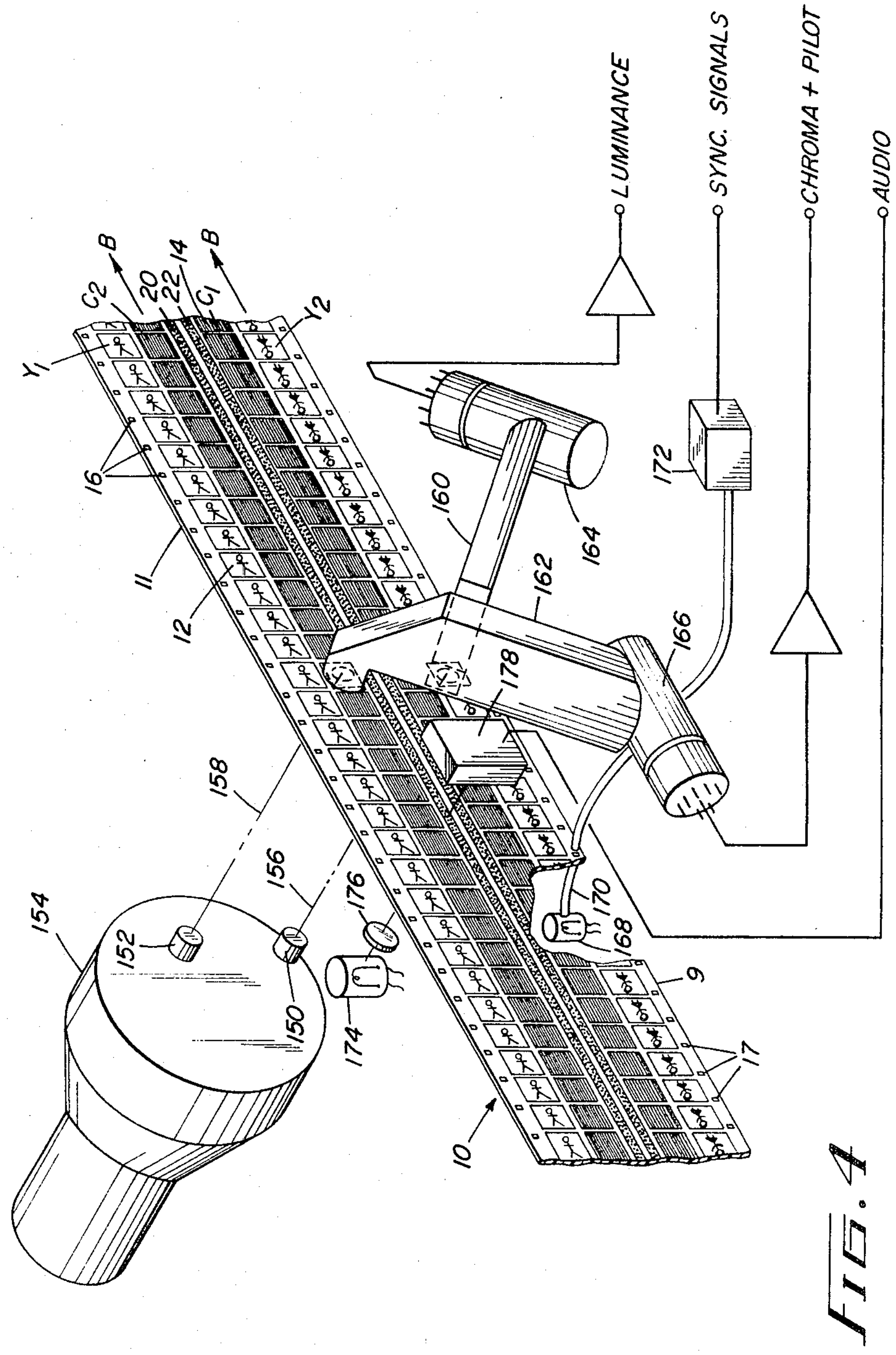
FIG. 4 is a perspective view, somewhat diagramatic, of playback apparatus for reproducing the record medium.

FIG. 4 is a somewhat diagramatic view, greatly enlarged, of portions of the player apparatus positioned behind the film gate 116 and within the sensor assembly 118 which cooperate to scan the continuously moving film and produce electrical signals representative of the picture information photographically recorded on the film. Keeping in mind the description of the player apparatus of FIG. 3, the film 10 is transported from left to right, the edge 9 engaging a guide surface (not shown) to serve as a reference for establishing the vertical position of the film as it passes through the scanning station. As was mentioned earlier, the color program recorded in companion frames $Y_2$ and $C_2$ are laid out with reference to the edge 9 and, accordingly, it is this color program that is scanned as the film is moved to the right, the arrows B associated with the $Y_2$, $C_2$, it will be noted, corresponding to the arrows B in FIG. 1. The luminance and chrominance frames $Y_2$ and $C_2$ are simultaneously scanned in a direction transversely of the film with a dual optical system which includes two lenses 150 and 152 placed in front of the face of a cathode ray tube 154 and arranged to image a raster appearing on the face of the cathode ray tube onto the film gate to form two substantially identical phosphor-dot images with centers spaced apart a distance corresponding to the distance between corresponding points on companion $Y_2$ and $C_2$ picture frames. The focused spots produced by the lenses 150 and 152 are represented by scanning light beams 156 and 158, respectively, which, it will be understood, scan in unison. During playback, the film is continuously advanced in the direction of the arrows B and the scanning light spots scan the film transversely in a television raster pattern. As the film moves at a constant speed of three inches per second, the beams also move in the same direction but at twice the velocity, or 6 inches per second; that is, the dimension of one full raster scan is twice the pitch distance between consecutive frames of the sequence. This technique is described in the aforementioned IEEE Spectrum article.

The modulated light beams passing through the companion $Y_2$ and $C_2$ frames are collected by a pair of "Lucite" light pipes 160 and 162, respectively, contained within the sensor post 118 and conducted unto respective photomultiplier tubes 164 and 166. The output signal from photomultiplier 164 contains the luminance information recorded on the $Y_2$ frames on the film, and the signal from photodetector 166 contains the chroma plus pilot information recorded on the $C_2$ frames. These signals are amplified and processed by additional components in the player (not shown) in the manner described in the aforementioned Spectrum article and in co-pending application Ser. No. 47,740 of Goldberg and McMann filed June 19, 1970, and assigned to the assignee of the present invention. The output of the playback apparatus is a composite NTSC television signal which can be applied to the antenna terminals of a conventional television receiver for display of the video program recorded on the film.

As in the system described in the Spectrum article, synchronization of film advance with the scan is accomplished by sensing pulses of light passing through the synchronization windows 17 located along the edge 9 of the film, which is the bottom edge when the color program $Y_2$, $C_2$ is being reproduced. A lamp 168 and associated fiber-optics light pipe 170 directs a narrow beam of light against the reverse side of the film in the marginal region containing the synchronizing marks, and pulses of light passing through the transparent windows are sensed by a suitable photodetector 172, preferably a solid state device. The output of the photodetector 172 is connected to suitable circuitry (not shown) which is operative to trigger vertical flyback of the flying spot of cathode ray tube 154 and to stablize film speed in the manner described in the aforementioned Spectrum article.

The sound track 20 associated with the color program $Y_2$, $C_2$ is reproduced by a separate optical system including an exciter lamp 174 and a lens 176, both contained within the housing 116 for the film gate, which focuses a beam of light onto the variable-area track. The light beam modulated by the sound track is detected by a suitable photodetector 178 contained within the sensor post 118, the output of which represents the audio signal associated with the first color program.

It will be observed that when the cassette is flipped over from the position shown in FIG. 4 the frames $Y_1$ and $C_1$ and the synchronizing marks 16 and sound track 22 take the positions which had been formerly occupied by their counterparts on the first program. Accordingly, the second color program is reproduced in the same manner without modification of any of the parts of the playback system.

It will be noted that in the present film format, companion frames of a color program are separated from each other by the sum of the widths of one frame sequence and the center strip 18, or approximately 140 mils. This relatively large spacing allows a degree of design freedom in the shape and positioning of light pipes 160 and 162, and an opportunity for more efficient optics than when the related frames are essentially adjacent to each other, as is the case with the film format described in the Spectrum article. Thus, the film format according to the invention contributes to the simplicity and efficiency of the playback apparatus.

Figure 5:
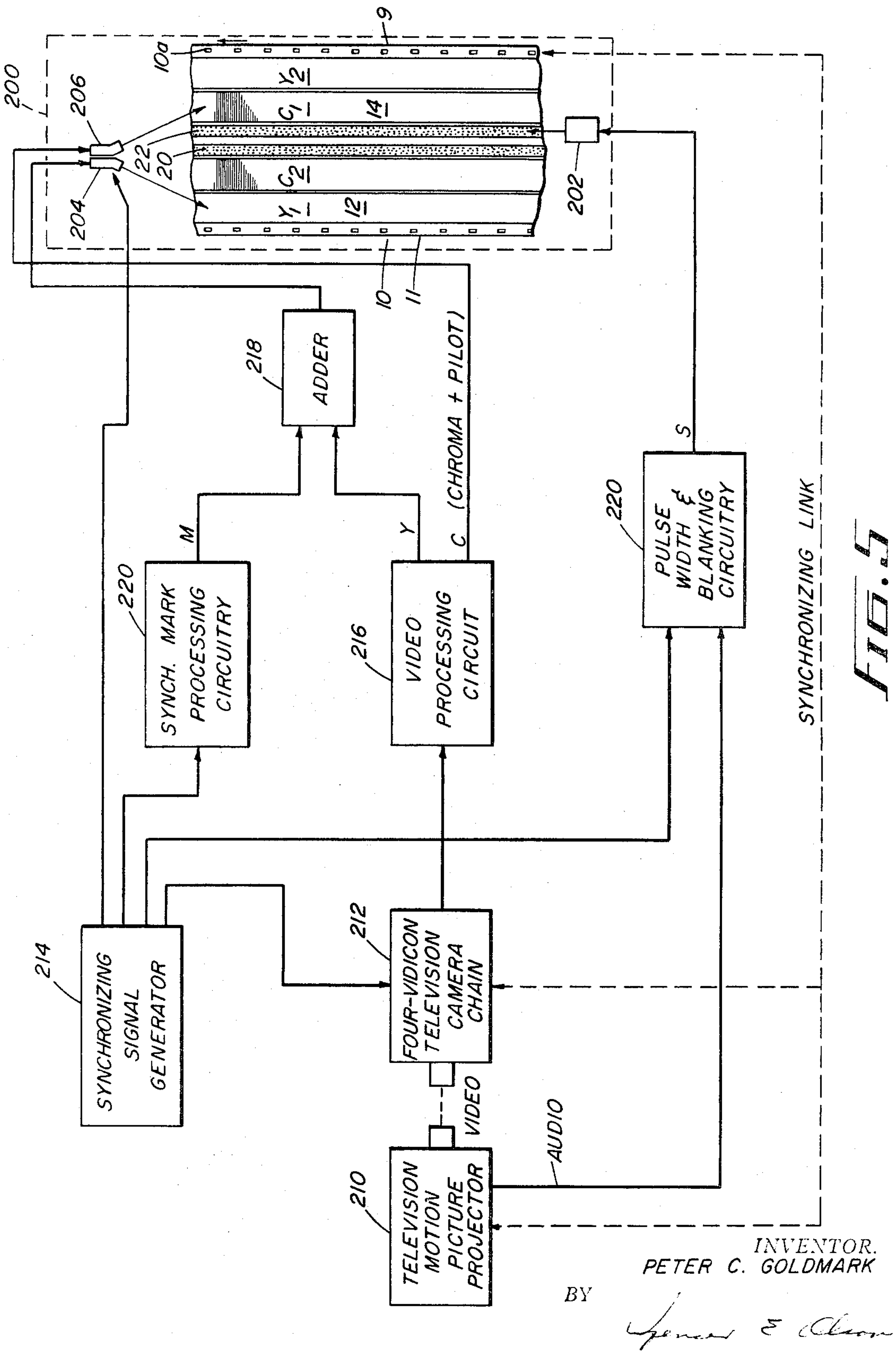
FIG. 5 is a schematic block diagram of apparatus for producing the record medium.

The film according to the invention may be produced by apparatus of the types disclosed in the aforementioned co-pending application Ser. No. 61,424, which describes both optical and electron beam recording techniques. Although any of these methods are suitable for producing the present film format, because of the small frame size and the requirement for high resolution, the electron beam method is preferred. A suitable electron beam recorder and associated circuitry are schematically illustrated in FIG. 5. The electron beam exposes the film 10*a* in an evacuated enclosure 200, the film being transported therethrough by a suitable drive mechanism (not shown) which engages sprocket holes disposed along the edges thereof. The raw film 10*a* on which the program information is initially recorded is wider than the release prints illustrated in FIG. 1 by the width of the sprocketed strips. Mounted within the enclosure are three electron guns 202, 204 and 206, the first being arranged to record the optical sound track along the center line of the film, and the guns 204 and 206 being provided to record luminance and chrominance information, respectively. The electron guns 204 and 206 are desirably in the form of a dual-beam gun, both of which are scanned with a common deflection system with their beams directed for simultaneous recording of the luminance and chroma signals along the spaced apart strips designated Y and C.

The recording system can operate directly with real-time signals from television cameras or film, and by way of illustration, a film projector 210 is positioned to project a motion picture image in color onto the sensitive elements of a conventional high resolution four-vidicon color television camera chain 212. Synchronizing and blanking signals are supplied to the camera chain from a synchronizing signal generator 214. The output of the camera chain is applied to video processing circuitry 216 which produces an aperture-corrected luminance signal Y, and a coded color signal C consisting of chroma side bands and a pilot signal. A detailed description of the video processing circuitry, which includes aperture-correction circuits, color carrier and pilot signal generators, and modulator and mixer circuitry, is found in the aforementioned co-pending application Ser. No. 61,424. The Y signal is applied to an adder 218 for combination with other signals (to be described), and the C signal is applied to the intensity control of electron gun 206.

Vertical and horizontal synchronizing signals from generator 214 are also applied to synch mark processing circuitry 220 which is operative to produce an output signal M that is used to produce the synch marks 16 and 17 associated with the companion frames on the film 10 (FIG. 1). A detailed disclosure of processing circuitry 220 is contained in copending application Ser. No. 776,137 of Goldmark et al., filed Nov. 15, 1968, and assigned to the assignee of the present invention. The M signal is added to the Y signal in adder 218, and the composite signal is applied to the intensity control of electron gun 204. Appropriate horizontal and vertical deflection and blanking signals for electron guns 204 and 206 are supplied from signal generator 214.

The audio signal associated with the motion picture to be recorded is supplied by the projector 210 to pulse width and blanking circuitry 220, to which is also applied vertical and horizontal synchronizing signals from generator 214. The pulse width and blanking circuitry 220 produces a signal S consisting of timed blanking and unblanking commands representative of the audio signal and of a form suitable to produce a variable-area optical sound track. Pulse modulating and blanking circuitry suitable for this purpose are described in Goldmark et al. U.S. Pat No. 3,335,219. The S signal is applied to the intensity control of the electron gun 202. Although the relative positions of the electron guns 202, 204 and 206 is illustrated very schematically, it should be pointed out that the sound track may be delayed slightly, by as much as four or five frames, from the picture information with which it is associated. That is, for film motion in the direction of the arrow, the optical sound track recorded by electron gun 202 is delayed slightly relative to the picture information recorded on the film by electron guns 204 and 206. A slight displacement is not objectionable in reproduction of the program and provides the important advantage of permitting the audio detection system 174, 176 and 178 (FIG. 4) to be positioned slightly "upstream" from the scanning station so as not to interfere with the luminance and chroma signals and to facilitate assembly of the necessary detectors in a confined space.

In operation, the raw film 10*a* is positioned on the driving mechanism and the enclosure 200 thereafter sealed and evacuated to the proper beam recording pressure by a suitable vacuum system (not shown). The color film (with sound) to be recorded is projected by projector 210, which is operated in synchronism with the television camera chain 212 and the film driving mechanism, as indicated by the dotted line labeled "synchronizing link". The electron guns are aimed and focused as indicated to produce the film format shown in FIG. 1. Assuming, for example, that the first program on the film of FIG. 1 is being recorded, the frames $Y_1$ are formed line-by-line by the electron beam from gun 204 as the film is continuously moved by the drive mechanism. The signal M causes unblanking of the electron beam at the very beginning of each of the first few horizontal scan lines of each new vertical trace to form the synch marks 16. Simultaneously with the recording of the luminance frame and its associated synch mark, electron gun 206 records the companion $C_1$ frame.

When the first program is completed, the film 10*a* is turned over and again transported through the recorder to record the second program (which is typically a continuation of the first) in a similar manner as the film is moved in the opposite direction. Upon completion of the recording, the film is processed in a known manner to produce a master from which multiple release prints may be produced as by contact printing.

I claim:

1. A record medium for use in the reproduction of four segments of picture information comprising:

an elongated thin strip of transparent material having first, second third and fourth sequences of mutually adjacent frames disposed longitudinally thereon in substantially parallel relationship, each sequence representing a segment of picture information, said parallel sequences having their lateral positions across the film designated in numerically ascending order from one to four;

the frames of the first and third sequences being oriented for reproduction of their picture information as said strip is advanced in one longitudinal direction and the frames of the second and fourth sequences being oriented for reproduction of their picture information as said strip is advanced in the opposite longitudinal direction.

2. A record medium as defined by claim 1 further including at least two tracks of audio information disposed longitudinally on said strip in a central elongated area between said second and third sequences of frames.

3. A flipover type cassette adapted for placement on playback apparatus for reproduction of picture information recorded on a record medium comprising:

a flat housing generally rectangular in shape except for a recess of generally rectangular shape extending inwardly from one of the long edges and located centrally of the length thereof, said housing having slits therein at the outer corners of said recess for the passage of a record medium, first and second reels suported within said housing for rotation about axes normal to the flat surfaces of the housing, and a record medium as defined by claim 1 having its ends secured to said first and second reels, respectively, and extending from one reel to the other through said slits so as to expose a section of the record medium across the open side of said recess.

4. A record medium as defined by claim 1 wherein one of said first and third sequences of frames contains monochrome representations of the luminance information of color pictures and the other contains monochrome representations of the color information of said color pictures, each laterally corresponding pair of frames of said first and third sequences containing the luminance and color information for a given video scene.

5. A record medium as defined by claim 4 wherein one of said second and fourth sequences of frames contains monochrome representations of the luminance information of color pictures and the other contains monochrome representations of the color information of said color pictures, each laterally corresponding pair of frames of said second and fourth sequences containing the luminance and color information for a given video scene.

6. A record medium as defined by claim 5 further including at least two tracks of audio information disposed longitudinally on said strip in a central elongated area between said second and third sequences of frames.

7. A record medium as defined by claim 6 wherein said tracks of audio information are in optically coded form.

8. A record medium as defined by claim 7 further including at least one series of synchronizing marks disposed longitudinally on said strip.

9. A record medium as defined by claim 7 further including two series of synchronizing marks disposed along respective edges of said strip.

10. A record medium as defined by claim 9 wherein said first and third sequences of frames, one of said audio tracks and one of said sequences of synchronizing marks comprises the video, audio, and synchronization information associated with a first color program.

11. A record medium as defined by claim 10 wherein said second and fourth sequences of frames, another of said audio tracks and the other of said sequences of synchronizing marks comprises the video, audio, and synchronization information associated with a second color program.

12. A record medium as defined by claim 11 wherein said strip of transparent material is Diazo film having a width of approximately 11.6 millimeters whereby three records each containing four segments of picture information can be made from commercially available 35 mm. film.

13. A flipover type cassette for the storage of a film record of picture information and adapted for placement on playback apparatus for reproduction of the picture information recorded thereon, comprising:

a flat housing generally rectangular in shape except for a recess of generally rectangular shape extending inwardly from one of the long edges and located centrally of the length thereof, and having a height slightly greater than the width of the film contained therein, said housing being fully enclosed except for a slit located at each of the outer corners of said recess for the passage of film therethrough, first and second flangeless reels supported within said housing for rotation about axes normal to the flat surfaces of the housing, and a record medium as defined by claim 11 having its ends secured to said first and second reels, respectively, and extending from one reel to the other through said slits so as to expose a section of the film across the open side of said recess.

* * * * *